United States Patent [19]

Beierle et al.

[11] Patent Number: 4,738,205
[45] Date of Patent: Apr. 19, 1988

[54] HEATING STOVE WHICH INCLUDES A PYROLYSIS GASIFIER

[75] Inventors: Frederick P. Beierle, Prosser, Wash.; Bridell T. Boyer, Mio; Richard A. Suisse, Luzerne, both of Mich.

[73] Assignee: Ablestien Industries, Inc., Prosser, Wash.

[21] Appl. No.: 57,778

[22] Filed: Jun. 3, 1987

[51] Int. Cl.⁴ .............................................. F23G 5/12
[52] U.S. Cl. ....................................... 110/229; 48/76; 48/111; 110/101 CD
[58] Field of Search ........ 110/229, 230, 231, 101 CD; 48/76, 77, 101, 111, 203, 209, 210

[56] References Cited

U.S. PATENT DOCUMENTS

| | | | |
|---|---|---|---|
| 4,213,404 | 7/1980 | Spaulding | 110/229 |
| 4,306,506 | 12/1981 | Rotter | 110/229 |
| 4,513,671 | 4/1985 | Eshleman | 110/101 CD |
| 4,531,462 | 7/1985 | Payne | 110/101 CD |
| 4,659,340 | 4/1987 | Weaver | 48/76 |

Primary Examiner—Edward G. Favors
Attorney, Agent, or Firm—Graybeal, Jensen & Puntigam

[57] ABSTRACT

The heating stove system includes a fuel hopper (10) from which fuel is fed into a pyrolysis gasifier (12) by means of a fuel auger apparatus (14). Controlling the entry of biomass input and air into the gasifier and ignition of the material in the gasifier is a head valve apparatus (16) which includes an igniter (129). The gasifier (12) in operation produces carbon and fuel gas which are moved into a stove burner (90) by a blower apparatus (18). The operation of the heating stove system is automatically controlled from a thermostat (150).

19 Claims, 4 Drawing Sheets

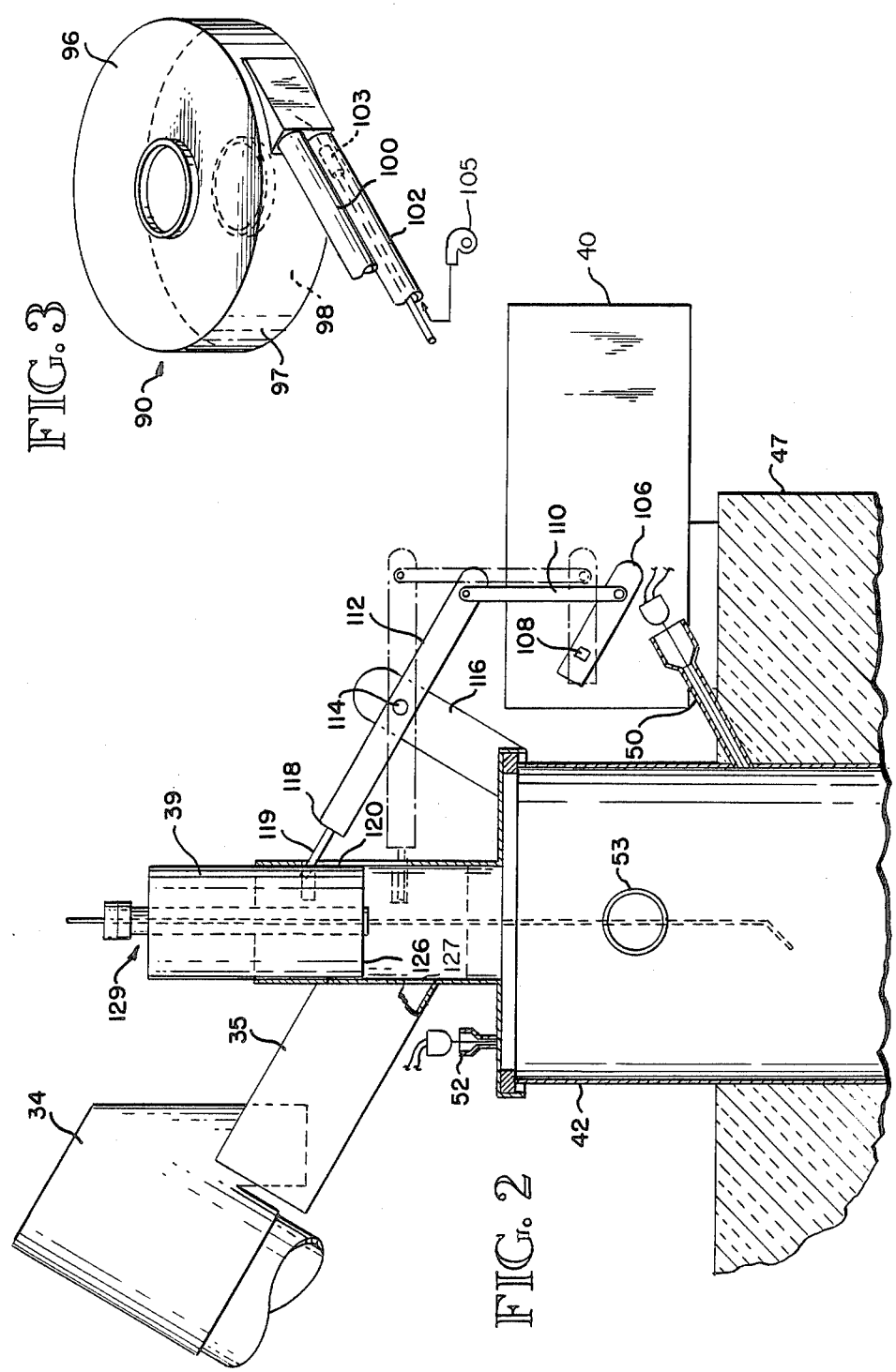

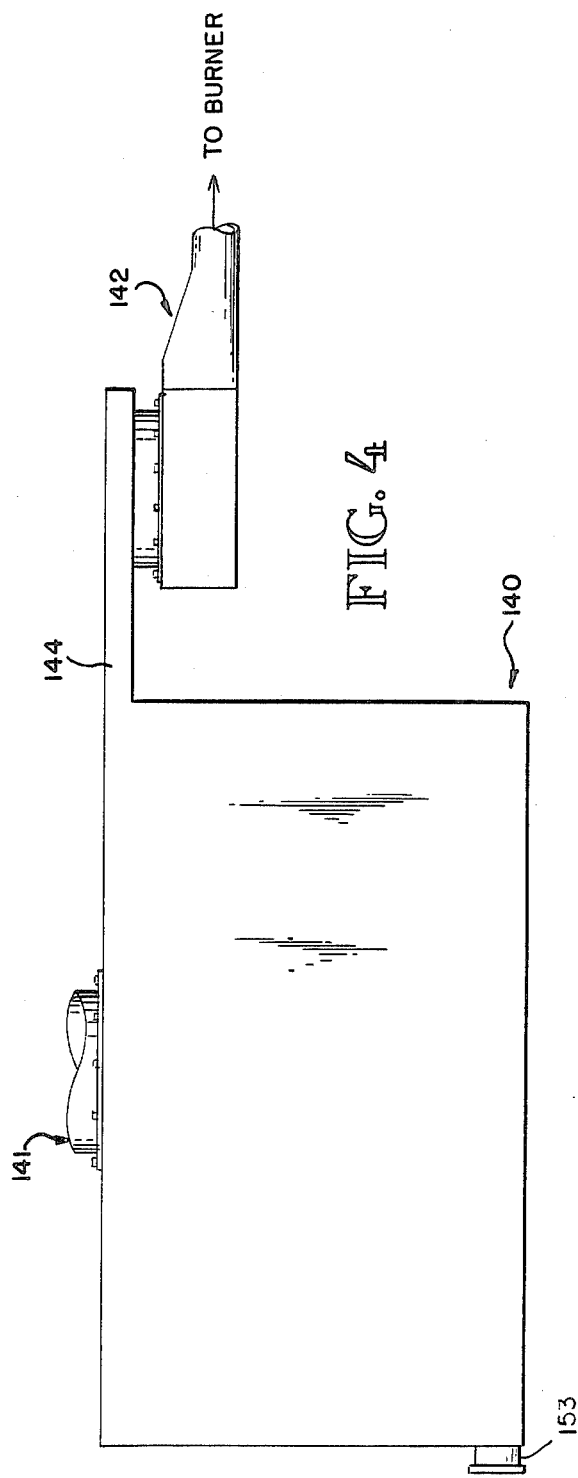

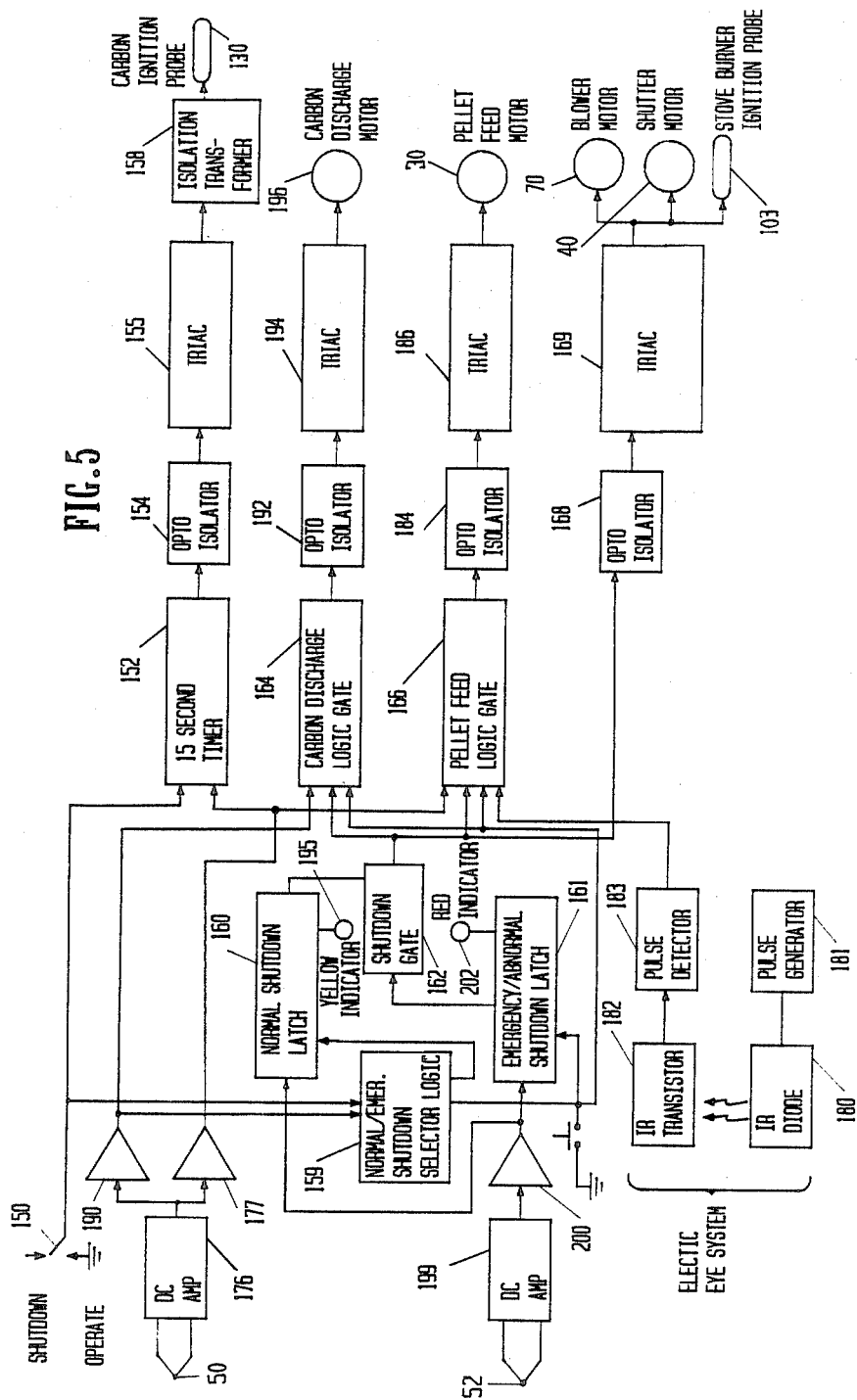

HEATING STOVE WHICH INCLUDES A PYROLYSIS GASIFIER

TECHNICAL FIELD

This invention relates in general to residential and small business heating devices and more particularly concerns a heating stove which incorporates a pyrolysis gasifier. The gasifier in operation produces fuel gas from a biomass input, which gas is then burned in the heater.

BACKGROUND ART

In general, the use of stoves for the purpose of space heating, such as residences and small businesses, is well known. Such heating devices are generally referred to as wood stoves and are available in a wide variety of configurations and designs. They may take the form of an actual stove-like device or a fireplace insert and are typically located inside the residence or other area to be heated. These stoves typically burn conventional firewood or pelletized fuel. The pelletized fuel may be made from different types of biomass, including sawdust, wood chips, different grasses, etc. In such wood stoves, the fuel is actually burned in a separate chamber or burner within the stove itself.

Such biomass fuel, including pellets, has also been used in gasifier technology, in which the biomass fuel input is used to produce fuel gas and carbon. Included in gasifier technology in general is the process of pyrolysis reduction, which basically is a chemical reduction of a selected biomass input in the absense of a flame. Pyrolysis generally is a controlled, relatively efficient process for producing fuel gas from a selected input. U.S. Pat. No. 4,421,524, in the name of Chittick and U.S. Pat. No. 4,530,702 in the name of Fetters et al, disclose pyrolysis gasifiers and the contents thereof are hereby incorporated by reference.

The use of a pyrolysis gasifier using a pelletized biomass input as part of a heating stove system would appear to have certain advantages, but heretofore, such a combination has not been particularly practical, due to the lack of automatic control of the operation of the combination apparatus from a thermostat. While a pyrolysis gasifier is capable of accommodating a wide variety of inputs, it heretofore has been primarily used to produce relatively large quantities of fuel gas on a steady state operation basis, particularly for power applications. Typically a human operator has been required to periodically monitor the operation of the gasifier. Such systems which are subject to a varying demand in particular have required relatively regular observation by a skilled operator.

Accordingly, the inability to automatically control a pyrolysis gasifier, so as to satisfy a variable demand, has substantially prevented the use of such gasifiers in applications such as space heating. The present invention is directed toward solving these problems and providing, in the preferred embodiment, a practical thermostat controlled space heating apparatus using a pyrolysis-type gasifier which accommodates a variable demand.

DISCLOSURE OF THE INVENTION

The invention includes a gasifier means for reduction of biomass input material to produce fuel gas and charcoal, and means for burning the fuel gas produced by the gasifier means. Means are also provided for drawing air through the gasifier for reduction of the input and for moving the fuel gas produced by the gasifier means to the fuel gas burner. The invention also includes means for automatically adding additional biomass input material to the gasifier when the level of biomass input then present in the gasifier falls below a preselected level. Means are further provided for automatically igniting the material in the gasifier, typically existing charcoal, when the system thermostat changes from an off condition to an on condition. The system further includes means for automatically controlling the level of charcoal in the gasifier and means for automatically terminating the operation of the gasifier when the thermostat is in an off condition and the biomass input has been substantially all reduced to charcoal.

BRIEF DESCRIPTION OF THE DRAWINGS

FIG. 2 is an elevational view showing the head valve portion of the present invention of FIG. 1 in more detail.

FIG. 3 is an isometric view of the stove burner portion of the present invention.

FIG. 4 is an elevational view showing an alternative embodiment of one portion of the present invention of FIG. 1.

FIG. 5 is a block diagram showing the flow of system control for the present invention.

BEST MODE FOR CARRYING OUT THE INVENTION

Figure 1:
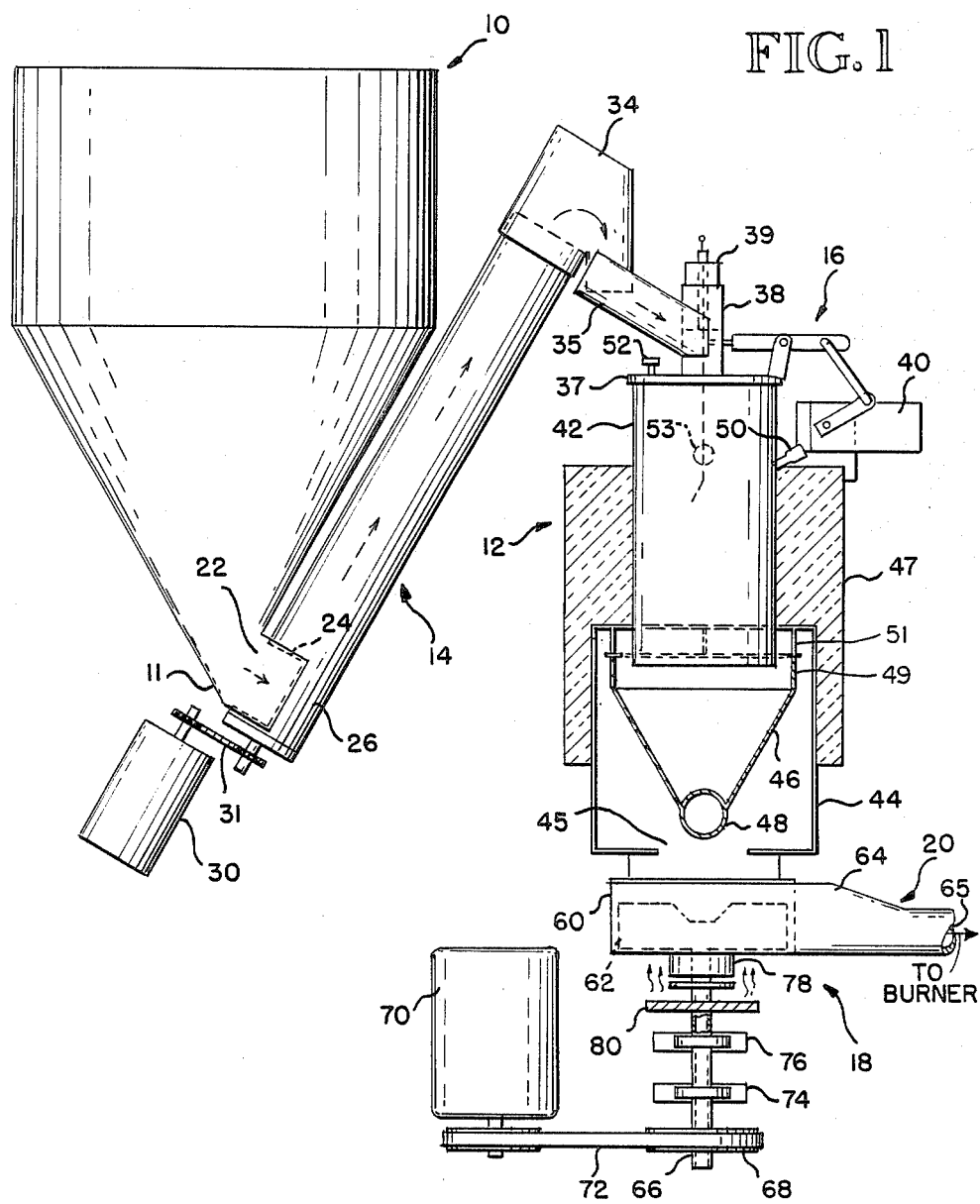
FIG. 1 is an elevational, partly cross-sectional view of the heating stove system of the present invention, excluding the stove burner portion thereof, which is shown in FIG. 3.

Referring to FIG. 1, the present invention, in general terms, is a heating stove system, useful in the form of the preferred embodiment primarily for residences, small business spaces and the like, wherein the stove system includes a pyrolysis gasifier which is used to produce gas and carbon, which in turn are directed into a stove burner portion of the system, located in a fireplace insert or conventional wood stove housing.

Generally, the stove system of the present invention includes a fuel hopper 10, a pyrolysis gasifier shown generally at 12, a fuel auger apparatus 14, a head valve apparatus 16 which opens a path for air and fuel into the pyrolysis gasifier 12, and a blower apparatus 18 at the bottom of the pyrolysis gasifier 12 which directs the fuel gas produced by the pyrolysis gasifier 12, as well as the carbon produced by the gasifier, if desired, into a stove burner unit, such as shown in FIG. 3.

Typically, but not necessarily, the above apparatus will be located externally of the residence or other building to be heated, with a pipe extending from the gasifier into the stove or fireplace insert located within the residence. The blower 18 moves the fuel gas and carbon from the gasifier into the burner located in the stove or fireplace insert. The system control flow for the automatic operation of the apparatus of FIG. 1, from a thermostat, which is set by an operator at a desired temperature, is shown in FIG. 5.

Referring now more particularly to FIG. 1, the fuel hopper 10 in the embodiment shown is in the form of a relatively large funnel-like element, which is square in cross-section in the embodiment shown, approximately 36 inches high and approximately 24 inches on a side at its top. In the embodiment shown the hopper 10 is made from steel. The hopper 10 has a uniform cross-section at the upper end thereof and tapers from there to a point at its lower end 11. In the vicinity of the lower end 11 is an opening 22 which in the embodiment shown is in the form of a square, 4 inches on a side.

Extending outwardly of the hopper from the edge of opening 22 is a short section 24 which extends into the auger apparatus 14, which includes a tube-like body 26 and a corkscrew-like conventional auger (not shown) which extends the length of the body 26. The corkscrew auger is turned by a motor 30 operating via a chain connection 31 to the bottom of the corkscrew auger. In the embodiment shown, the auger body 26 has a diameter of approximately 4 inches and extends upwardly substantially adjacent the tapering portion of the hopper 10 as shown to an uppermost point which is slightly below the top edge of the fuel hopper and a few inches away from the side wall thereof at that point.

The auger body 26 terminates in a cap 34 which fits over the upper end 27 of the auger body 26 and is formed so as to define a downwardly extending spout 20 from the upper end of the auger body 26. The cap 34 extends into a downwardly sloping short chute 35 which is open along its upper surface and extends away from the fuel hopper 10 and into a vertically oriented entry tube 38 which is positioned centrally of the upper end cover 37 of the gasifier 12 and opens into the interior of the gasifier.

Inside the entry tube 38 is positioned a vertically movable head valve 39. The head valve 39 is controlled through a shutter motor 40 and associated connecting linkage. The head valve, the shutter motor and the connecting linkage are explained in more detail below.

The gasifier 12 is conventional in structure and operation. It includes a stainless steel inner cylindrical chamber 42 which in the embodiment shown is approximately 8 inches in diameter and 16 inches high. The chamber 42 is open at its lower end and closed at the top by cover 37, except for entry tube 38. Extending outwardly from chamber 42 near the lower end thereof is a lower surrounding chamber 44. The chamber 44 has a diameter of approximately 12 inches and extends vertically from an upper horizontal surface which is several inches above the lower edge 43 of chamber 42 to a lower horizontal surface which is 10 inches below the lower edge 43 of chamber 42 and has a central opening 45 therein which is approximately 5 inches in diameter.

Housed inside the lower surrounding chamber 44 is a conical element 46 which extends beneath the lower edge 43 of chamber 42. The conical element 46 has a portion 49 at its upper end which is of uniform diameter, somewhat greater than the diameter of chamber 42, i.e. approximately 10 inches in the embodiment shown. At the bottom of conical element 46 is an opening in which is positioned a conventional star valve 48. The star valve 48 is supported on either side by bronze bushings, which have been found to add to the life of the apparatus. The top edge of element 46 is connected to the upper interior surface of chamber 44. There are, however, cutout portions 51 spaced at regular intervals, such as 90 degrees, around the periphery of the top edge of element 46, allowing fuel gas to pass therethrough. Alternatively, a series of openings could be provided in element 46 around the periphery thereof in the vicinity of the upper edge thereof. The portion 49 of element 46 is thus located between the vertical walls of chambers 42 and 44 respectively.

Thus, there is a path for movement of fuel gas which extends around the lower edge 43 of chamber 42, then upwardly between the chamber 42 and the top portion 49 of trough 46, then outwardly through the cutout portions 51 in the upper edge of element 46, then downwardly between chamber 44 and element 46, and then downwardly and out of chamber 44 through opening 45.

An insulating chamber 47 surrounds a portion of both chambers 42 and 44. Chamber 47 has a diameter of 15 inches and a height of 16 inches. The space between chamber 47 and chambers 42 and 44 is filled with a ceramic wool insulation or equivalent.

In operation of the gasifier, it should be understood that there exists a bed of charcoal/carbon in the gasifier prior to ignition. The charcoal bed substantially fills the cone element 46 and extends upwardly into chamber 42 a given distance. After the charcoal bed has been ignited, a pyrolysis reduction zone is established near the upper end of the charcoal bed. In the pyrolysis zone, the subsequent fuel pellet input is basically reduced to fuel gas and charcoal. The fuel gas moves out of the gasifier as explained above, while the charcoal moves downwardly as part of the bed. At the lower end of the cone 46, the charcoal is in the form of small carbon particles, which are moved out of the gasifier through the operation of star valve 48.

The gasifier includes first and second thermocouples 50 and 52 and an electric eye structure 53 (FIG. 2). The first thermocouple 50 is positioned in the side wall of chamber 42 and extends slightly into the chamber. It is positioned somewhat above where the pyrolysis zone is established in the charcoal bed during operation of the gasifier 12. The second thermocouple 52 is positioned in the cover 37 of chamber 42 and extends into the interior space between the upper surface of the fuel head in chamber 42 and the cover 37.

The electric eye structure 53 is positioned in the wall of the first chamber 42 slightly above the location of the first thermocouple 50. The electric eye includes an infrared light emitting portion, such as a light emitting diode (LED) positioned on one side of the chamber 42 and a detector portion, such as an infrared detector, positioned on the opposing side of the chamber 42. The electric eye structure 53 is in the embodiment shown mounted 90 degrees laterally from thermocouple 50.

In operation of the electric eye 53, a beam of infrared light is transmitted across the interior of chamber 42. Infrared light is detected if the fuel head in chamber 42 is low enough to expose both the light emitting diode and the detector. The thermocouples 50 and 52 and the electric eye 53 will be discussed in more detail below in conjunction with the description of the operation of the apparatus.

Extending downwardly from the lower end of chamber 44 is blower apparatus 18, which includes a housing 60 within which is mounted for horizontal rotation a fan 62. The blower 18 includes a horizontally extending exit nozzle 64 which tapers down to a tubular pipe 65 which is approximately 2 inches in diameter in the embodiment shown. The tubular pipe 65 connects to to the burner in the stove or fireplace insert, shown in FIG. 3.

The fan 62 is mounted on the top end of a central blower shaft 66 which extends vertically downwardly through an opening in the lower surface of blower housing 60. The shaft 66 is approximately 1 inch in diameter and extends approximately 15 inches below the blower housing, and is made of steel in the embodiment shown. Near the lower end of central shaft 66 is a horizontal pulley 68. A blower motor 70 rotates shaft 66 at a high speed by means of a belt 72 operating on pulley 68.

At spaced intervals upwardly along shaft 66 are two bearings 74 and 76 which are mounted on a vertical plate (not shown) and which provide the bearing support necessary for reliable long term operation of the blower. A seal 78 provides integrity between the housing 60 and central shaft 66. A set of fan blades 80 are attached to the central shaft 66 between the top bearing 76 and the seal 78. The fan blades are in the form of paddles, pitched at approximately 45 degrees to the horizontal. Rotation of the shaft by the motor 70 results in movement of air around shaft 66, tending to prevent overheating.

An additional feature which promotes cooling of the blower is that the shaft 66 is hollow from the lower end 69 thereof upwardly to a point between the fan blades and the top bearing, where the hollow portion exits through the side of the shaft. The above-described blower has been found to be operable over extended periods of time without overheating.

In operation of the above-described structure, the fuel gas and carbon exit from the gasifier into the blower housing 60, from where they are moved by the fan 62 through exit nozzle 64, through the tubular pipe 65 and into the stove burner.

Referring now to FIG. 3, the stove burner used in the present invention is shown. In the embodiment shown, the burner, shown generally at 90, comprises an annular ring-like structure or doughnut, having a curved outside vertical wall 92, a flat top plate 96 and a flat bottom plate 98. Each plate 96 and 98 has a central opening. The burner 90 is typically made from ⅛ inch steel. The burner in the embodiment shown has an outside diameter of 16 inches. The openings in the top and bottom plates have a diameter of 6 inches and are in registry. The burner is thus open to the atmosphere about the center of both the top and bottom surfaces.

Extending into the burner 90 through wall 92 is a fuel pipe 100. In the embodiment shown, the fuel pipe 100 enters the burner along a path tangent to the outer wall. Thus, gas entering the burner from the pipe 100 tends to enter the burner coincident with the existing circular flow in the burner, and thus tends to move around the interior of the burner following its circular interior configuration.

In the embodiment shown an air supply tube 102 is positioned parallel with, and directly below, the fuel pipe 100 and enters the burner in the same manner, i.e. tangent to the outer wall 92. Pipe 102, like pipe 100, has a diameter of 1½ inches. The two pipes could also have different dimensions. If both carbon and fuel gas are directed into the burner through the fuel pipe 100 then it is necessary to have air directed into the burner through the air pipe 102. Typically the volume of air introduced into the burner is 3-4 times the volume of gas. This is accomplished by a burner blower 105. Also, the configuration of the burner should be like that shown, so that the carbon is kept moving within the burner. The combination of (1) keeping the carbon in motion by virtue of the configuration of the burner and by vitue of the path and volume of additional air, and (2) maintaining a substantial flow of oxygen in the burner results in all the carbon being consumed. A spark igniter 103 extends into the burner through pipe 102 as shown and provides the required ignition of the burner. The igniter 103 could be mounted differently, although the spark from the igniter should occur at the point where the air and gas meet.

However, if carbon is not to be introduced into the burner but just fuel gas is used, then additional air through pipe 102 is not necessary.

The addition of carbon into the burner with the fuel gas provides a pleasing visual effect because the particles swirl around the burner with the gas, and at least some of the particles escape from the burner through the central openings, thereby giving an unusual "sparkler" effect about the burner.

FIG. 2 shows the head valve portion of the present invention in more detail. The head valve apparatus includes a standard shutter motor 40 and a first arm 106 which is mounted about one end thereof to the output shaft 108 of the shutter mounted, which in operation tends to hold the arm 106 in the same position, approximately a 30-45 degree downwardly sloping angle. A second arm 110 is pivotally connected about one end to the first arm 106 and extends vertically upwardly from the first arm 106. The opposing end of second arm 110 is connected to one end 113 of an actuating arm 112 which is rotated about a center pivot 114 positioned on a brace 116 which extends upwardly at about a 45 degree angle from the corner of upper chamber 42.

The other end 118 of actuating arm 112 has a narrow probe 119 which extends therefrom and through a vertical slot 120 in the side of the entry tube 38 at the top of the chamber 42. The probe 119 extends into an opening in the head valve 39 which is in a sealing relationship with the interior vertical surface of the entry tube 38.

The head valve 39 is arranged so that when actuating arm 112 is in its operative position, shown by the solid lines in FIG. 2, the lower surface 126 of the head valve clears the opening 127 in the side of tube 38 for the fuel and air chute 35, thereby permitting air and fuel into the chamber 42. When the shutter motor is off, the actuating arm 112 moves to a horizontal position, and the head valve 39 moves by gravity downwardly until the actuating arm 112 is approximately horizontal. At this point, the head valve is in such a position as to seal off the fuel and air opening 127 into the entry tube 38. The position of the valve 39 and arms 112, 110 and 106 when the shutter motor 104 is off is shown in dotted lines in FIG. 2.

Positioned centrally in head valve 39 is a carbon rod ignition element 129, a probe portion 130 of which extends down into the interior of chamber 42. The lower end of probe 130 is bent at a slight angle, as shown. When the head valve 39 is in its lowermost position, probe 130 extends approximately 9 inches into the chamber and into the charcoal bed. The ignition element 129 is responsible for igniting the charcoal bed in the gasifier.

In operation, current is supplied to the ignition system and the shutter motor, blower motor, and in the case where carbon is used in the burner, the burner blower as well, are actuated at approximately the same time. The operation of the shutter motor results in the slow raising of the head valve 39 and hence the raising of the ignition probe 130, which is arcing through the charcoal bed. By the time the head valve has been raised to its uppermost position, the charcoal bed has been ignited and current to the ignition element is terminated.

FIG. 4 shows an alternative arrangement relative to the lower end of the gasifier unit, including the position of the blower. In the embodiment of FIGS. 1 and 2, as explained above, the blower unit, including the associated shaft, bearings, motor, exterior fan, etc., is positioned directly below the gasifier, and during operation thereof, both carbon and fuel gas are received by the blower and moved into the tubular pipe 65 which leads to the stove burner.

In the embodiment of FIG. 4, however, the carbon produced by the gasifier is separately captured and only the fuel gas produced by the gasifier is directed to the burner by the blower. In such an embodiment a housing 140 is connected to the lower end of gasifier chamber 44, essentially in place of the blower in FIG. 1. The housing has a diameter of approximately 38 inches and is about 22 inches high. The housing 140 has an opening 141 which mates with the opening in the bottom of the chamber 44, so that the gas and the carbon produced by the gasifier move downwardly into the housing 140.

The blower unit 142, which includes all of the elements shown in FIG. 1, but is shown schematically in FIG. 4, is in communication with the housing 140 by means of a shallow connecting extension 144 which extends from one side of the housing near the top thereof. Substantially only fuel gas moves through extension 144 and is then moved into the burner by blower 142. The carbon collects in housing 140, from where it is periodically removed through an exit tube 153.

FIG. 5 shows the operational control sequence of the heating stove of the present invention. Thermostat 150 basically controls the operation of the system. When the temperature of the environment at the thermostat falls below the set temperature, the thermostat 150 moves to its operate condition and a fifteen second timer 152 is initiated, the output of which is directed to an optical isolator 154, which in turn is connected to a carbon ignition triac circuit 155 and an isolation transformer 158. Current from transformer 158 is applied to the carbon ignition probe 130 which is the depending portion of ignition system 129 and extends down into the charcoal bed in the gasifier.

At the same time, when the thermostat 150 is in its operate position, and there are no overriding shutdown indicators, as explained in more detail below, the shutdown logic circuit 159, the shutdown latch circuits 160, 161 and the shutdown gate 162 are in such a condition that enabling signals are applied to the carbon discharge logic gate 164, the pellet feed logic gate 166, and to optical isolator 168 which controls triac 169, the output of which is applied to the blower motor 70, the shutter motor 40 and the stove burner igniter 103, resulting in those three device initiating operation.

When shutter motor 40 operates, the head valve 39 moves up, and the entry tube opening 127 is exposed, such that air is drawn down through the charcoal bed by the operation of the blower, powered by motor 70.

After the charcoal bed has been initially ignited by probe 130, the temperature of the bed will gradually increase to operating temperature and the bed will be ignite over the entire cross-sectional area of the gasifier. When thermocouple 50, the output of which is amplified by a DC amplifier 176, senses a temperature of 300 degrees F., as indicated by a comparative operational amplifier 177, it is a reliable indication that the bed has been thoroughly ignited, the fifteen second timer 152 is disabled if it has not already turned off automatically, and current to probe 130 is terminated. The 300 degree temperature could be set within a ±25 range about 300 degrees.

Thermocouple 50 is located in the side of the gasifier, as shown in FIGS. 1 and 2. The signal from the op amp 177 will result in a second enable signal to pellet feed logic gate 166. The pellet feed circuit and the carbon discharge circuit are now both completely enabled for operation, pending recognition of particular operating conditions within the gasifier as explained below.

Also at this point, the electric eye system is initiated, which comprise an infrared light emitting diode transmitter 180, driven by pulse generator 181, an infrared detector 182 and pulse detector 183. The diode 180 and the detector 182 are positioned as explained above in the gasifier chamber walls at the lowermost desired height of the biomass input fuel bed.

When an infrared light signal is received at detector 182, it is amplified by pulse detector 183. The signal from detector 183 will then be applied to the pellet feed AND gate 166 which will then produce an output to optical isolator 184, which controls triac 186, which in turn will initiate operation of the feed pellet motor 30 (FIG. 1).

A high output from AND gate 166 thus occurs when the top of the material in the chamber 42 is below the level of the electric eye, when the thermostat is in the operate condition, when the thermocouple 175 senses a temperature of at least 300 degrees F., and when the gasifier is not in a shutdown condition. The motor 30 will move biomass fuel pellets from the fuel hopper into the gasifier, as explained above, resulting in a "head" of unreacted biomass input in chamber 42, until the infrared signal path of the electic eye system is broken by the level of pellets. This pellet feed process will be initiated periodically as required, automatically controlled by the electric eye system.

During normal operation, the pyrolysis zone in chamber 42 will tend to rise, because of the accumulation of charcoal due to the reduction of the biomass fuel pellets in the pyrolysis zone. At some point, the pyrolysis zone, the temperature of which is substantially higher than that of the biomass fuel head above it, will come into the near vicinity of the thermocouple 50, such that temperature sensed by thermocouple 50 will rise dramatically. When that sensed temperature reaches 1000 degrees F., which could be also set within a range of ±25 degrees relative to 1000 degrees F., as determined by comparative operational amplifier 190, an output of amplifier 190 will be applied to the carbon discharge AND gate 164. AND gate 164 will then provide a "high" output, since the other two inputs to AND gate 164 are also both high. This condition occurs when thermocouple 175 senses a temperature of at least 1000 degrees, when thermostat 150 is in an operate condition, and when the apparatus is not in a shutdown condition.

The output of AND gate 164 is applied to optical isolator 192, which controls triac 194. The output of triac 194 controls the carbon discharge motor 196 which operates the star valve 48 in FIG. 1. The motor 196 will move the star valve which will in turn move the carbon at the bottom of the cone element 46 into the blower unit from where it is moved either into the burner or falls into a separate housing, as explained above. The motor 196 will continue to run, removing carbon, until the charcoal bed (and hence the pyrolysis zone) drops sufficiently that the temperature at thermocouple 50 drops below 1000 degrees F. The cone shaped element 46, the single star valve at the bottom thereof and the fact that the upper portion of element 46 has a larger diameter than chamber 42 combine to effect an even drop of the charcoal bed across the cross section of chamber 42. No point of the bed drops faster than any other point, which is advantageous in the operation of the gasifier.

The apparatus may be shutdown in one of two ways. When the thermostat 150 changes from its operate condition to its shutdown condition, such as when the temperature of the environment is greater than the set temperature, normal shutdown occurs. The resulting thermostat signal is applied to the selector logic circuit 159, after which nothing occurs until thermocouple 50 senses a temperature of 1000 degrees F. When this occurs, circuit 159 turns on shutdown latch 160, which results in the disabling of both the pellet feed and carbon discharge AND gates, 166 and 164. However, the gasifier will continue to operate, since air is still being drawn down through the unit by the blower.

As the unreacted biomass fuel pellets forming the fuel head in chamber 42 are reduced in the pyrolysis zone to fuel gas and carbon, however, the temperature above the fuel head will rise. When thermocouple 52 at the top of chamber 42 senses a temperature of 750 degrees, which could be set within a range of ±25 degrees, as determined by comparative operational amplifier 200, a signal is generated which switches the state of previously enabled shutdown latch 160. This turns the shutdown gate 162 off, resulting in the blower motor 70, shutter motor 40 and stove burner igniter 103 being disabled. The gasifier thus shuts down, because no air can be drawn through the unit. Typically this occurs, i.e. a temperature of 750 degrees F. is sensed by thermocouple 52, when all the biomass fuel pellets in chamber 42 have been reacted to charcoal. Also, yellow indicator 195 is energized, indicating a normal shutdown. The system now waits for the thermostat to change again to the operate position, at which point the above operation is repeated.

In addition to the normal shutdown procedure, there is an emergency shutdown procedure which is initiated when the thermocouple 52 senses a temperature of 750 degrees F. when the thermostat 150 is in the operate position. This indicates an abnormal situation in the operation of the gasifier, such as might happen where there are insufficient pellets in the hopper and therefore insufficient biomass input fuel in the gasifier. When that condition occurs, the abnormal shutdown latch circuit 161 operates and a signal is applied to shutdown gate 162. The output of gate 162 is applied to both the carbon discharge and pellet feed AND gates which change state and result in the disabling of motors 196 and 30. The output of gate 162 is also applied to isolator 168, resulting in the blower motor 70, the shutter motor 40, and the stove burner ignition probe 103 also being disabled. The red indicator 202 is also lit, providing notice to the operator to check the system.

Thus, a heating stove system has been described which uses a pyrolysis gasifier to produce fuel gas which is burned in the stove as well as carbon, which may also be burned in the stove to produce particular visual effects. The stove is controlled from a thermostat, and is completely automatic in operation, including startup and shutdown of the pyrolysis gasifier portion of the system.

Although a preferred embodiment of the invention has been disclosed herein for purposes of illustration, it should be understood that various changes, modifications and substitutions may be incorporated in such embodiment without departing from the spirit of the invention which is defined by the claims which follow.

We claim:

1. A heating stove, comprising:
    gasifier means for reduction of biomass input material to produce fuel gas and charcoal;
    means for burning the fuel gas produced by the gasifier means;
    means for drawing air through the gasifier means and for moving the fuel gas produced by the gasifier means to the fuel gas burner;
    means for automatically adding biomass input material to the gasifier means when the biomass input material present in the gasifier means is below a preselected level;
    means for automatically igniting the existing charcoal in the gasifier means in response to a thermostat changing to an on condition from an off condition;
    means for automatically controlling the level of charcoal in the gasifier means; and
    means for automatically terminating the operation of the gasifier means when the thermostat is in an off condition and the biomass input material has been substantially all reduced to charcoal.

2. An apparatus of claim 1, wherein said gasifier means reduces the biomass input by pyrolysis.

3. An apparatus of claim 2, wherein said biomass input adding means and said controlling means are operative only when the thermostat is in an on condition.

4. An apparatus of claim 3, including means for determining when the charcoal in the pyrolysis reduction means has been substantially fully ignited, indicative of the substantial establishment of a pyrolysis zone therein within which pyrolysis zone the biomass input material is reduced to fuel gas and charcoal and wherein said biomass input adding means is operative thereafter only.

5. An apparatus of claim 2, including blower means for drawing air down through the gasifier means and for moving the fuel gas into the burner means.

6. An apparatus of claim 5, wherein the blower means also moves the charcoal produced by said gasifier means, in the form of carbon particles, to said burner means.

7. An apparatus of claim 6, wherein the burner means includes a first entry port for entry of the mixture of carbon and fuel gas, and a second entry port for entry of air, said second entry port being located substantially immediately below said first entry port.

8. An apparatus of claim 4, wherein said determining means is a thermocouple positioned in the gasifier means and set at a first selected temperature.

9. An apparatus of claim 6, wherein the first selected temperature is approximately 300 degrees F., ±25 degrees.

10. An apparatus of claim 2, wherein said controlling means includes means for removing carbon from the gasifier when the temperature at a pre-established position within the gasifier reaches a selected level.

11. An apparatus of claim 10, wherein the selected temperature level is approximately 1000 degrees F., ±25 degrees.

12. An apparatus of claim 8, including means for disabling the biomass adding means and the carbon removal means as a result of the thermostat changing from an on condition to an off condition.

13. An apparatus of claim 1, wherein the terminating means includes means for sensing the temperature within the gasifier means above the top of the biomass input material and for terminating the operation of the gasifier when the temperature sensor reaches a predetermined level.

14. An apparatus of claim 13, wherein said predetermined level is approximately 750 degrees F., ±25 degrees.

15. An apparatus of claim 13, wherein the terminating means operates when the predetermined temperature level is sensed regardless of whether the thermostat is on or off.

16. An apparatus of claim 2, wherein said igniting means includes a head valve positioned in a entry tube which extends upwardly from the top of said gasifier means and further includes means for moving the head valve between a first position in which air and biomass input material are permitted to enter the gasifier means and a second position, in which air and biomass input material are not permitted to enter the gasifier, the igniting means further including an ignition element which extends from the head valve down into the gasifier means, wherein the ignition element, when energized, produces an electric arc through the charcoal in the gasifier, causing the ignition of the charcoal when air is moved therethrough as well.

17. An apparatus for controlling the entry of air and biomass input material into a gasifier, comprising:
   inlet means extending upwardly from the top of the gasifier, wherein said inlet means includes an opening therein through which biomass input material and/or air can enter the gasifier;
   valve means adapted and supported for vertical movement within the inlet means, said valve means having a sealing relationship with the interior surface of the inlet means; and
   means for moving the valve means between two vertical positions, the first position being such as to substantially close the opening in the inlet means, and the second position being such that the opening is exposed.

18. An apparatus of claim 17, including ignition means supported by said valve means and extending downwardly from the valve means into the gasifier, wherein the ignition means, when energized, ignites the existing material in the gasifier when air is moved through the existing material at the same time.

19. An apparatus of claim 17, wherein said moving means includes a shutter motor and linkage means which extends between the shutter motor and the valve means, and wherein the shutter motor is arranged such that when the shutter motor is operating, the linkage means maintains the valve means in its second position, and that when the shutter motor is not operating, the valve means is permitted to move by gravity into its first position.

* * * * *